(12) United States Patent
Ogino (10) Patent No.: US 10,021,314 B2
(45) Date of Patent: Jul. 10, 2018

(54) IMAGE PROCESSING APPARATUS, IMAGE CAPTURING APPARATUS, METHOD OF CONTROLLING THE SAME, AND STORAGE MEDIUM FOR CHANGING SHADING USING A VIRTUAL LIGHT SOURCE

(71) Applicant: CANON KABUSHIKI KAISHA, Tokyo (JP)

(72) Inventor: Hiroshi Ogino, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 8 days.

(21) Appl. No.: 15/435,504

(22) Filed: Feb. 17, 2017

(65) Prior Publication Data

US 2017/0251136 A1    Aug. 31, 2017

(30) Foreign Application Priority Data

Feb. 26, 2016 (JP) .................... 2016-036313

(51) Int. Cl.
*H04N 5/235* (2006.01)
*H04N 5/232* (2006.01)
*H04N 5/243* (2006.01)

(52) U.S. Cl.
CPC ....... *H04N 5/2354* (2013.01); *H04N 5/23229* (2013.01); *H04N 5/243* (2013.01)

(58) Field of Classification Search
CPC .. H04N 5/2354; H04N 5/23229; H04N 5/243; H04N 5/2351; H04N 5/235
See application file for complete search history.

(56) References Cited

U.S. PATENT DOCUMENTS

2010/0134495 A1* 6/2010 Matsui ................. G06T 15/50
345/426
2012/0120071 A1* 5/2012 Thorn .................. G06T 15/506
345/420

FOREIGN PATENT DOCUMENTS

JP       2012-165171 A    8/2012
WO  WO-2016047072 A1 *  3/2016  ......... H04N 5/23219

* cited by examiner

*Primary Examiner* — Nicholas G Giles
(74) *Attorney, Agent, or Firm* — Cowan, Liebowitz & Latman, P.C.

(57) ABSTRACT

An image processing apparatus comprises: an obtainment unit configured to obtain an image captured in accompaniment of an emission of a predetermined light source; a setting unit configured to set a virtual light source to be applied to the image based on a characteristic of the predetermined light source; and a generation unit configured to generate an image for which a shading state of at least one of a plurality of subjects included in the image is changed due to the virtual light source, wherein the setting unit is configured to set the virtual light source so that a difference between a change of a shading state in a first subject due to the predetermined light source and a change in the shading state in a second subject due to the predetermined light source is reduced.

15 Claims, 7 Drawing Sheets

IMAGE PROCESSING APPARATUS, IMAGE CAPTURING APPARATUS, METHOD OF CONTROLLING THE SAME, AND STORAGE MEDIUM FOR CHANGING SHADING USING A VIRTUAL LIGHT SOURCE

BACKGROUND OF THE INVENTION

Field of the Invention

The present invention relates to an image processing apparatus, an image capturing apparatus, a method of controlling the same, and a storage medium.

Description of the Related Art

Generally, if an amount of light of a light source is insufficient when capturing a subject, the captured image becomes darker. A method by which capturing is performed after irradiating light on the subject using an illumination apparatus such as a flash, for example, and ensuring that there is a sufficient amount of light to make a dark image brighter is known.

However, if the distance from the illumination apparatus to a subject differs for each subject, the amount of light irradiated on each subject differs, and therefor there are cases in which the amount of light irradiated is not appropriate depending on the subject. For example, if light is irradiated from an illumination apparatus so that the amount of light irradiated on a main subject is appropriate, there is the possibility that blown-out highlights will arise when the amount of light is excessive in subjects that are closer to the illumination apparatus than the main subject. Meanwhile, there is the possibility that shadow detail loss will arise when the amount of light is insufficient in subjects that are further from the illumination apparatus than the main subject.

With respect to this problem, Japanese Patent Laid-Open No. 2012-165171 proposes a technique for adjusting the brightness by applying different gains to subjects in accordance with information of the distances from the illumination apparatus to the subjects in order to adjust the brightnesses of subjects whose distances from the illumination apparatus are different.

However, with the technique proposed in Japanese Patent Laid-Open No. 2012-165171, because the gain is applied by image processing (specifically, the signal is amplified), the noise is also amplified. Also, because the characteristics of the light source are not considered, there are cases in which a light-source color and reflection components according to the light irradiated from the illumination apparatus cannot be reproduced simply by reducing the differences in brightness of the subjects, and as a consequence it results in an unnatural image.

SUMMARY OF THE INVENTION

The present invention has been made in consideration of the aforementioned problems, and realizes a technique by which it is possible to perform an adjustment of shading that reflects a characteristic of a light source that emits light in an image in which are captured a plurality of subjects whose distances from the light source are different.

In order to solve the aforementioned problems, one aspect of the present invention provides an image processing apparatus comprising: an obtainment unit configured to obtain an image captured in accompaniment of an emission of a predetermined light source; a setting unit configured to set a virtual light source to be applied to the image based on a characteristic of the predetermined light source; and a generation unit configured to generate an image for which a shading state of at least one of a plurality of subjects included in the image is changed due to the virtual light source, wherein the setting unit is configured to, in a case where a first subject and a second subject, which are included in the image, are present at different distances from the predetermined light source, set the virtual light source so that a difference between a change of a shading state in the first subject due to the predetermined light source and a change in the shading state in the second subject due to the predetermined light source is reduced.

Another aspect of the present invention provides, an image capturing apparatus comprising: an image sensor configured to output a captured image; an obtainment unit configured to obtain an image captured in accompaniment of an emission of a predetermined light source; a setting unit configured to set a virtual light source to be applied to the image based on a characteristic of the predetermined light source; and a generation unit configured to generate an image for which a shading state of at least one of a plurality of subjects included in the image is changed due to the virtual light source, wherein the setting unit is configured to, in a case where a first subject and a second subject, which are included in the image, are present at different distances from the predetermined light source, set the virtual light source so that a difference between a change of a shading state in the first subject due to the predetermined light source and a change in a shading state in the second subject due to the predetermined light source is reduced.

Still another aspect of the present invention provides, a control method of an image processing apparatus comprising: obtaining an image captured in accompaniment of an emission of a predetermined light source; setting a virtual light source to be applied to the image based on a characteristic of the predetermined light source; and generating an image for which a shading state of at least one of a plurality of subjects included in the image is changed due to the virtual light source, wherein, in a case where a first subject and a second subject, which are included in the image, are present at different distances from the predetermined light source, the virtual light source is set so that a difference between a change of a shading state in the first subject due to the predetermined light source and a change in the shading state in the second subject due to the predetermined light source is reduced.

Yet another aspect of the present invention provides, a non-transitory computer-readable storage medium storing a program for causing a computer to execute a control method of an image processing apparatus comprising: obtaining an image captured in accompaniment of an emission of a predetermined light source; setting a virtual light source to be applied to the image based on a characteristic of the predetermined light source; and generating an image for which a shading state of at least one of a plurality of subjects included in the image is changed due to the virtual light source, wherein, in a case where a first subject and a second subject, which are included in the image, are present at different distances from the predetermined light source, the virtual light source is set so that a difference between a change of a shading state in the first subject due to the predetermined light source and a change in the shading state in the second subject due to the predetermined light source is reduced.

Still yet another aspect of the present invention provides, a control method of an image capturing apparatus comprising an image sensor and a flash apparatus, the control method comprising: capturing an image in accompaniment of an emission of the flash apparatus; setting a virtual light source to be applied to the image based on a characteristic of the flash apparatus; and generating an image for which a shading state of at least one of a plurality of subjects included in the image is changed due to the virtual light source, wherein, in a case where a first subject and a second subject, which are included in the image, are present at different distances from the flash apparatus, the virtual light source is set so that a difference between a change of a shading state in the first subject due to the flash apparatus and a change in the shading state in the second subject due to the flash apparatus is reduced.

Yet still another aspect of the present invention provides, a non-transitory computer-readable storage medium storing a program for causing a computer to execute a control method of an image capturing apparatus comprising an image sensor and a flash apparatus, the control method comprising: capturing an image in accompaniment of an emission of the flash apparatus; setting a virtual light source to be applied to the image based on a characteristic of the flash apparatus; and generating an image for which a shading state of at least one of a plurality of subjects included in the image is changed due to the virtual light source, wherein, in a case where a first subject and a second subject, which are included in the image, are present at different distances from the flash apparatus, the virtual light source is set so that a difference between a change of a shading state in the first subject due to the flash apparatus and a change in the shading state in the second subject due to the flash apparatus is reduced.

According to the present invention, it becomes possible to perform an adjustment of shading that reflects a characteristic of a light source which emits light in an image in which a plurality of subjects whose distances from the light source are different are captured.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments will be described hereinafter in detail, with reference to the drawings. Note that, as an example of an image processing apparatus, description is given below of an example of using a particular digital camera that can capture an image. However, the example described below is not limited to a digital camera, and can be applied to any device capable of performing a re-lighting process after obtaining a captured image. Such a device may include, for example, a mobile telephone, a game device, a tablet terminal, a personal computer, a clock-type or glasses-type information terminal, a monitoring system, a medical device, or the like.

(Configuration of Digital Camera 100)

Figure 1:
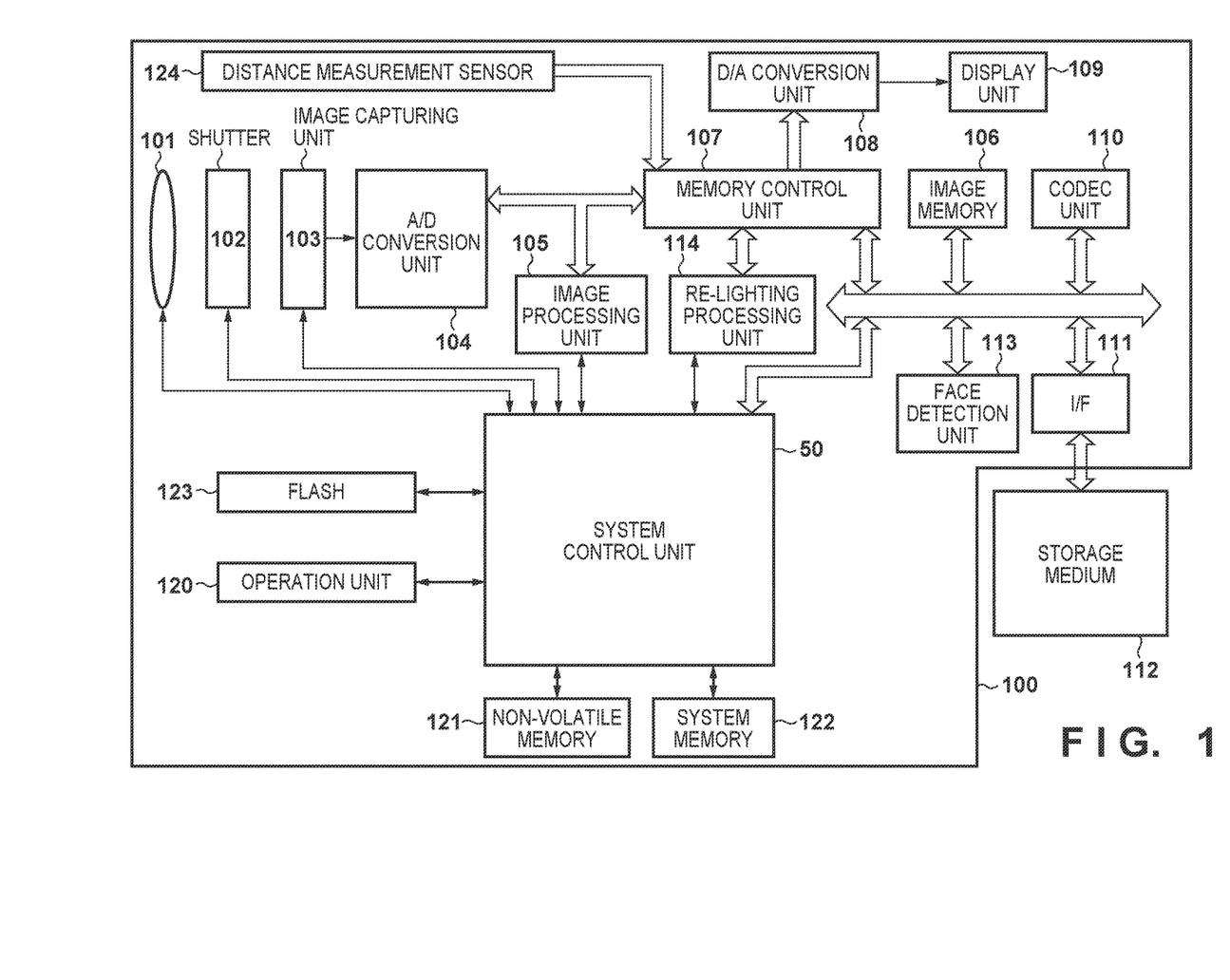
FIG. 1 is a block diagram illustrating a functional configuration example of a digital camera as an example of an image processing apparatus according to the embodiment.

FIG. 1 is a block diagram illustrating a functional configuration example of a digital camera 100 as an example of an image processing apparatus of the present embodiment. Note that, one or more of the functional blocks shown in FIG. 1 may be realized by hardware such as an ASIC, a programmable logic array (PLA), or the like, and may be realized by a programmable processor such as a CPU, an MPU, or the like, executing software. Also, these may be realized by a combination of software and hardware. Accordingly, in the following description, even in a case where different functional blocks are recited as the subject of operations, it is possible that this may be realized by the same hardware as the subject.

A lens group 101 is a lens group that includes a zoom lens and a focus lens. A shutter 102 is equipped with an aperture function, is provided between the lens group 101 and an image capturing unit 103. The image capturing unit 103 has an image sensor that photoelectrically converts an optical image formed on an imaging plane by the lens group 101 in pixels arranged two-dimensionally, and outputs an electrical signal in units of pixels. The image sensor may be a CCD image sensor or a CMOS image sensor. An A/D conversion unit 104 converts an analog signal output from the image capturing unit 103 to a digital signal (image data).

The image processing unit 105 performs various image processes described later with respect to image data outputted from the A/D conversion unit 104. An image memory 106 includes a volatile semiconductor memory, and temporarily stores image data outputted from the A/D conversion unit 104 or the image processing unit 105.

A memory control unit 107 controls reading and writing of the image memory 106 by the image processing unit 105 and a face detection unit 113. A D/A conversion unit 108 includes a circuit or module for converting a digital signal read out from the memory control unit 107 into an analog signal. A display unit 109 includes a display apparatus such as an LCD, an organic EL display, or the like, and displays various GUIs or live view images for operation of the digital camera 100, or an image that is reproduced after reading it out from a storage medium 112, or the like.

A codec unit 110 encodes by a predetermined method in order to record in a storage medium image data stored in the image memory 106, and decodes encoded image data included in an image file for display, for example. An interface (I/F) 111 is equipped with a mechanism for inserting/removing the storage medium 112 which is, for example, a semiconductor memory card or a card-type hard disk that can be attached/detached, and connects with the digital camera 100 mechanically and electrically.

A system control unit 50 includes a processor such as, for example, a CPU an MPU or the like, and loads into a system memory 122 and executes a program stored in a non-volatile memory 121, to control necessary blocks or circuits, and thereby realizes functions of the digital camera 100.

The face detection unit 113 detects a face region included in a captured image, and obtains face information such as a position, a size, a reliability or the like for each detected face region. Note that the face detection unit 113 can use any method such as a method using learning as typified by a neural network, or a method in which a feature part such as an eye, a nose, or a mouth is searched for in an image region by template matching, and a region having a high similarity is treated as a face.

The re-lighting processing unit 114 performs later described re-lighting processing on captured image data, and outputs an image whose subject shading states are changed. An operation unit 120 includes an input device such as a switch or a button for a user to input various instructions to the digital camera 100. A touch panel is included in the operation unit 120 if the display unit 109 is a touch display. Also, an input device of a type that inputs instructions in a non-contacting manner such as with speech input or line-of-sight input may be included in the operation unit 120.

The non-volatile memory 121 may be, for example, an EEPROM which can perform electrical deletion/recording. The non-volatile memory 121, in addition to recording various setting values, GUI data, and the like, for example, records programs that the system control unit 50 executes in cases where the system control unit 50 is an MPU or a CPU. The system memory 122 temporarily stores data into which constants and variables for operation of the system control unit 50, and programs read out from the non-volatile memory 121 are extracted.

A flash 123 includes a flash apparatus such as a flash, and emits light prior to capturing or upon capturing in accordance with an instruction of the system control unit 50. A distance measurement sensor 124 includes a sensor for measuring a distance between a subject and the digital camera 100, and outputs two dimensional distance information (subject distance information) obtained in units of pixels of the captured image.

(Basic Operation Upon Capture in the Digital Camera 100)

Next, description is given of basic operation upon capturing a subject in the digital camera 100 configured as described above.

The image capturing unit 103, within a predetermined time over which the shutter 102 is open, photoelectrically converts, by an image sensor, a subject image that the lens group 101 formed on an imaging plane, and accumulates a charge. Then, the image capturing unit 103 reads the accumulated charge at a predetermined timing, and outputs it as an analog image signal to the A/D conversion unit 104. The A/D conversion unit 104 converts the analog image signal outputted from the image capturing unit 103 to a digital image signal (image data), and outputs the result to the image processing unit 105.

The image processing unit 105 performs image processing such as, for example, synchronization processing (color interpolation processing or demosaic processing), or gamma (γ) correction on image data from the A/D conversion unit 104 or image data from the memory control unit 107. Also, in the image processing unit 105, predetermined calculation processing related to luminance, contrast, or the like is performed using image data obtained by capturing, and based on the obtained computation result, the system control unit 50 performs focus adjustment and exposure control. A detection result of the face detection unit 113 may be considered in the focus detection or exposure control. In this way, TTL (through the lens) type AF (auto focus) processing and AE (auto exposure) processing is performed in the digital camera 100 of the present embodiment. In the image processing unit 105, auto white balance (AWB) adjustment, which uses image data obtained by capturing, is also performed.

Image data outputted from the image processing unit 105 is written to the image memory 106 via the memory control unit 107. The image memory 106 stores image data outputted from the image capturing unit 103, image data for displaying on the display unit 109, or the like. In addition, the D/A conversion unit 108 converts data for image display stored in the image memory 106 into an analog signal, and supplies it to the display unit 109. The display unit 109 displays, on a display apparatus such as an LCD, in accordance with an analog signal from the D/A conversion unit 108.

The codec unit 110 encodes image data recorded in the image memory 106 by performing processing in conformance with a specification such as the JPEG or MPEG, for example. The system control unit 50 forms an image file adding a predetermined header or the like to encoded image data, and then stores it in the storage medium 112 via an I/F 111.

Note that the digital camera 100 can perform movie capturing in a capture standby state, and cause the display unit 109 to function as an electronic view finder (EVF) by continuously displaying captured moving images on the display unit 109. In such a case, the system control unit 50 controls to a state in which the shutter 102 is open, and controls the image capturing unit 103 to perform 30 frame/second capturing, for example, using a so-called electronic shutter of the image capturing unit 103.

Also, the system control unit 50 executes the foregoing AF and AE control if a half stroke is performed on a shutter button included in the operation unit 120, and when additionally a full stroke of the shutter button is performed, it executes still image capturing for recording by main capturing, and records the image data to the storage medium 112. Furthermore, if movie capturing is instructed by a movie capture button, movie recording to the storage medium 112 is started.

(Configuration and Operation of the Image Processing Unit 105)

Figure 2:
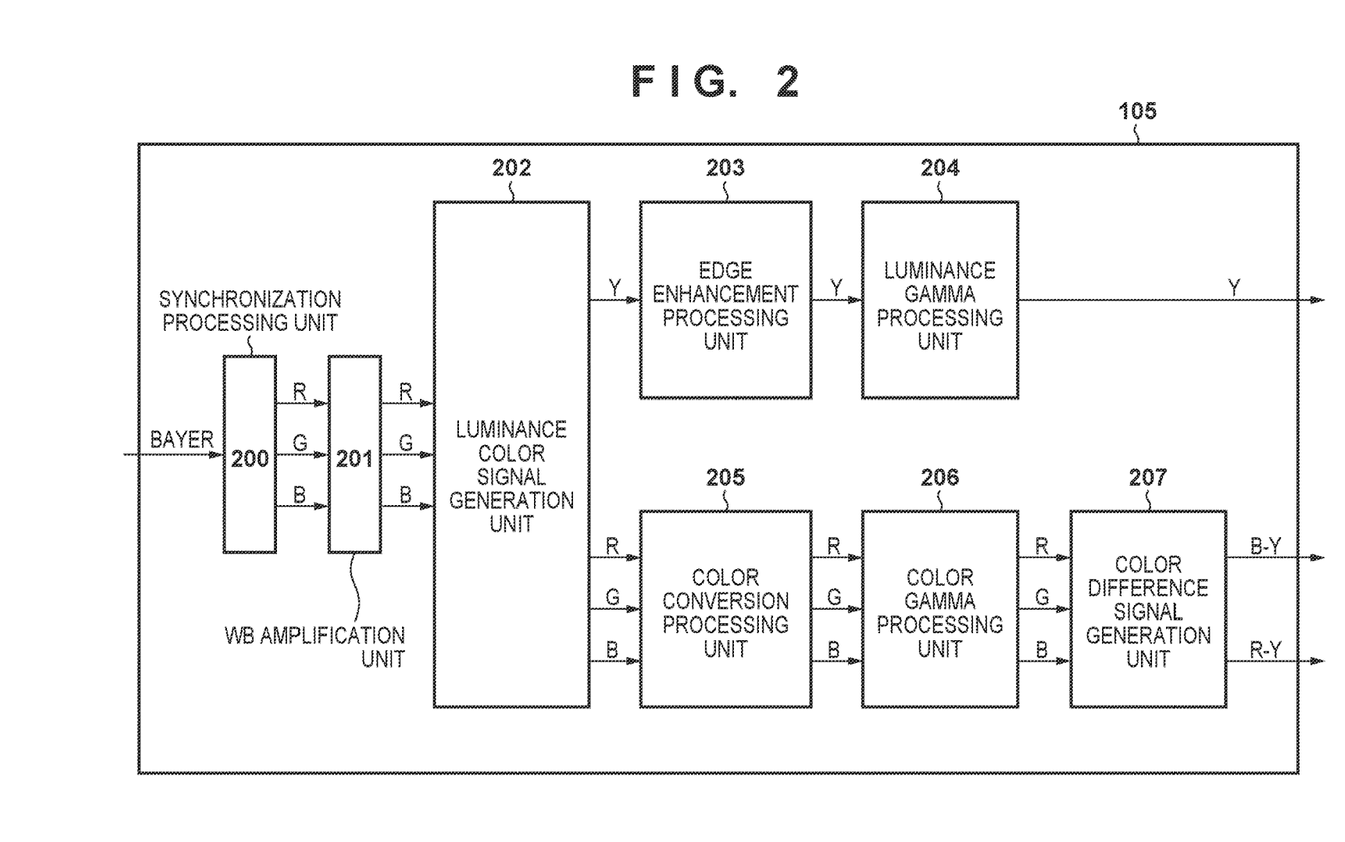
FIG. 2 is a block diagram illustrating a functional configuration example of an image processing unit 105 according to the embodiment.

Next, with reference to FIG. 2, the configuration and operation of the image processing unit 105 is described.

In FIG. 2, reference numeral 200 denotes a synchronization processing unit, reference numeral 201 denotes a WB amplification unit, reference numeral 202 denotes a luminance color signal generation unit, reference numeral 203 denotes an edge enhancement processing unit, reference numeral 204 denotes a luminance gamma processing unit, reference numeral 205 denotes a color conversion processing unit, reference numeral 206 denotes a color gamma processing unit, and reference numeral 207 denotes a color difference signal generation unit.

Image data from the A/D conversion unit 104 is inputted into the image processing unit 105, and the following processing is performed by each unit of the image processing unit 105. The synchronization processing unit 200 generates color signals R, G, and B by performing synchronization processing on Bayer RGB image data inputted from the A/D conversion unit 104 to the image processing unit 105. The WB amplification unit 201 adjusts the white balance by applying a gain to the RGB color signal based on a white balance gain value that the system control unit 50 calculates. The RGB signal outputted by the WB amplification unit 201 is inputted into the luminance color signal generation unit 202. The luminance color signal generation unit 202 generates a luminance signal Y from the RGB signal, and respectively outputs the generated luminance signal Y and the generated color signals RGB to the edge enhancement processing unit 203 and the color conversion processing unit 205.

The edge enhancement processing unit 203 performs edge enhancement processing on the luminance signal and outputs to the luminance gamma processing unit 204. The luminance gamma processing unit 204 performs gamma correction on the luminance signal Y in order cause it to match a display characteristic that the display unit 109 has, for example, and outputs the corrected luminance signal Y to the image memory 106.

The color conversion processing unit 205 converts the inputted RGB signals into a desired color balance by a matrix operation on the RGB signal, or the like. The color gamma processing unit 206 performs gamma correction on the RGB color signals to cause them to match the display characteristics that the display unit 109 or the like has, for example. The color difference signal generation unit 207 generates R-Y and B-Y signals which are color difference signals from the RGB signal. The image signal Y, and the R-Y and B-Y signals outputted to the image memory 106 are encoded by the codec unit 110 and stored in the storage medium 112.

(Configuration of the Re-Lighting Processing Unit 114)

Next, configuration of the re-lighting processing unit 114 will be described with reference to FIG. 3. Note that the re-lighting processing can be performed on an image captured in a state in which execution of re-lighting processing is designated, and on an image stored in the storage medium 112, for example, for which performance of the re-lighting processing is designated from a menu screen or the like. If information at the time of capture in the re-lighting processing is necessary, it is assumed to be read from the non-volatile memory 121 or the system memory 122, or obtained from an image file header or the like.

Figure 3:
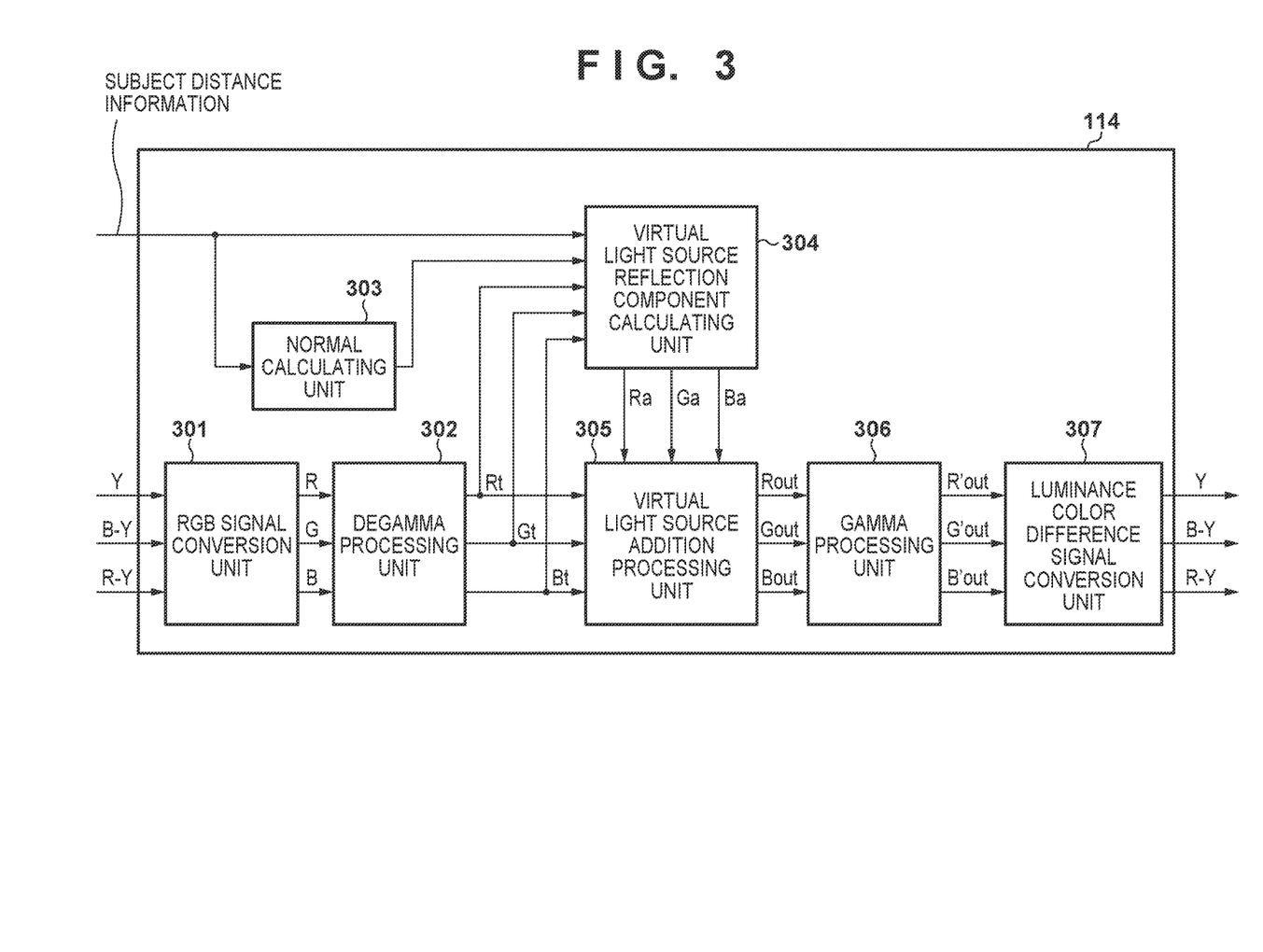
FIG. 3 is a block diagram illustrating a functional configuration example of a re-lighting processing unit 114 according to the embodiment.

In FIG. 3, an RGB signal conversion unit 301 converts inputted luminance/color signals (Y, R-Y, B-Y) into RGB signal to process calculations for re-lighting in the RGB signal. A de-gamma processing unit 302 performs de-gamma processing to return the signal whose characteristics are changed by the gamma processing in the image processing unit 105 to linear characteristics. Conversely, a gamma processing unit 306 once again changes the signal characteristics by performing gamma processing on the RGB signal whose shading state is changed by the re-lighting processing. Also, a luminance color-difference signal conversion unit 307 returns the RGB signal to luminance/color difference signals (Y, R-Y, B-Y) once again, and outputs from the re-lighting processing unit 114.

Meanwhile, a normal calculation unit 303 calculates a normal in a surface shape of a subject based on the subject distance information outputted from the distance measurement sensor 124. Note that the method by which the normal in the surface shape of the subject is calculated is described later. A virtual light source reflection component calculation unit 304 sets a pseudo light source (also called a virtual light source) which is arranged virtually, and calculates a component of light from the virtual light source that reflects in the surface of the subject. A virtual light source addition processing unit 305 outputs an image (RGB signal) that changes the shading state of a subject by adding to the input image a component of the reflection on the subject that occurs due to arranging the virtual light source.

(Series of Operations for Re-Lighting Processing)

Figure 4:
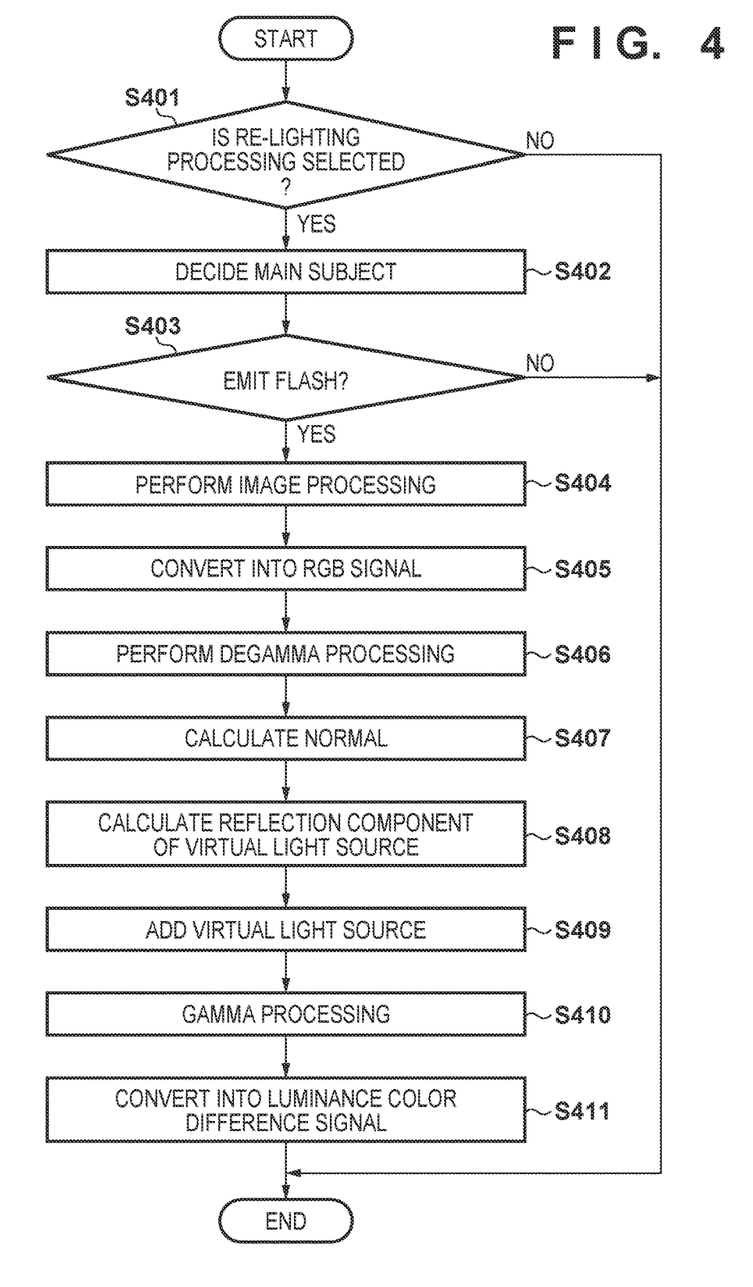
FIG. 4 is a flowchart for describing an operation of a series of re-lighting processes according to the embodiment.

Next, with reference to FIG. 4, a series of operations according to re-lighting processing is described. Note that, this processing is started when an image recorded in the storage medium 112 is selected in a menu screen included in the operation unit 120, for example. Also, this processing is realized by the system control unit 50 loading a program stored in the non-volatile memory 121 into a work region of the system memory 122 and executing it, and controlling each unit of the re-lighting processing unit 114 (including internal configuration elements).

In step S401, the system control unit 50 determines whether or not the re-lighting processing is selected by an operation from a user on the operation unit 120. Specifically, the system control unit 50 determines whether or not to perform processing by the re-lighting processing unit 114. The system control unit 50 references a parameter indicating performance of re-lighting processing such as a header of an image file, for example, and advances processing to step S402 if it determines that re-lighting processing is to be performed. Meanwhile, this processing is terminated if, referencing the parameter, it is determined that the re-lighting processing is not to be performed.

In step S402, the system control unit 50 decides a main subject included in the captured image. Note that in the present embodiment, an example of a case where the main subject is the face of a person is described. The system control unit 50 obtains information of the position and size of a face region which the face detection unit 113 detected by a publicly known method. The system control unit 50 decides the main subject based on the position and size of the face region if there are a plurality of faces of people. For example, it may select the person for which the size of the face is the largest as the main subject, or it may make the person closest to the center of the image the main subject. Note that the main subject need not be the face of a person and may be a human body or a part thereof.

In step S403, the system control unit 50 analyzes the brightness of a region of the main subject, and determines whether or not to emit a flash. Specifically, the system control unit 50 causes the flash 123 to emit light to make the brightness of the main subject an appropriate brightness if it determines that the brightness of the region of the main subject is lower than a predetermined threshold, and is insufficient with respect to appropriate brightness. The system control unit 50 advances the processing to step S404 if it determines that the flash 123 is to be caused to emit light, and terminates this processing if it determines that the flash is not to be caused to emit light.

In step S404, the image processing unit 105 performs the previously described predetermined image processing on the image data captured in a state in which the flash emitted light. The image data made up of luminance/color difference signals (Y, R-Y, B-Y) outputted from the image processing unit 105 is stored in the image memory 106 via the memory control unit 107.

In step S405, the RGB signal conversion unit 301 reads luminance/color difference signals (Y, R-Y, B-Y) which are stored in the image memory 106 via the memory control unit 107, and converts them into an RGB signal. The converted RGB signal are outputted to the de-gamma processing unit 302.

In step S406, the de-gamma processing unit 302 performs a calculation of characteristics opposite to gamma characteristics applied in the gamma processing unit of the image processing unit 105 to convert into linear data. The de-gamma processing unit 302 outputs the converted RGB signals (Rt, Gt, Bt) to the virtual light source reflection component calculation unit 304 and the virtual light source addition processing unit 305 respectively.

In step S407, the normal calculation unit 303 calculates a normal map based on subject distance information (specifically, two dimensional distance information obtained in units of pixels of the captured image) obtained from the distance measurement sensor 124 for the inputted RGB signals. While details of generation of the normal map based on the subject distance information are omitted since it can be performed using publicly known techniques, an overview of a normal map in the present embodiment is described with reference to FIG. 5.

Figure 5:
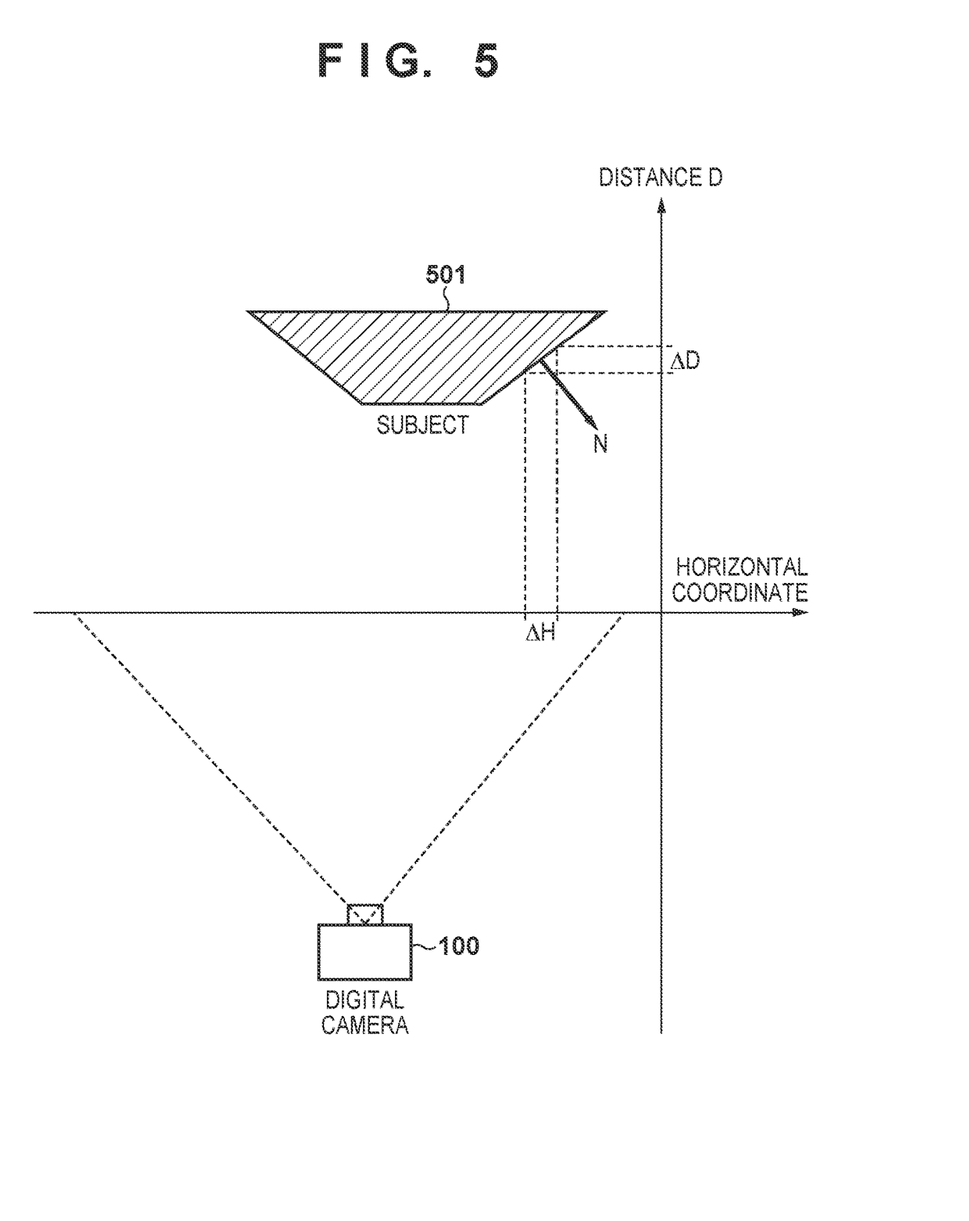
FIG. 5 is a diagram describing a relationship between camera capturing coordinates and a subject according to the embodiment.

FIG. 5 illustrates a relationship between horizontal coordinates and three-dimensional coordinates at which the subject is present on a captured image. In the present embodiment, by using subject distance information, a difference ΔD of a distance (depth) D in relation to a difference ΔH in a horizontal direction on the image is obtained. Accordingly, the normal calculation unit 303 can calculate a slope of a surface shape of a subject 501 based on the difference ΔD of the distance in relation to the difference ΔH. Then, by obtaining a normal for the calculated slope, it can calculate a normal vector N for the surface shape of the subject. The normal calculation unit 303 calculates a normal corresponding each pixel of the captured image by the same processing, and outputs the calculated normals to the virtual light source reflection component calculation unit 304 as a normal map.

Figure 6:
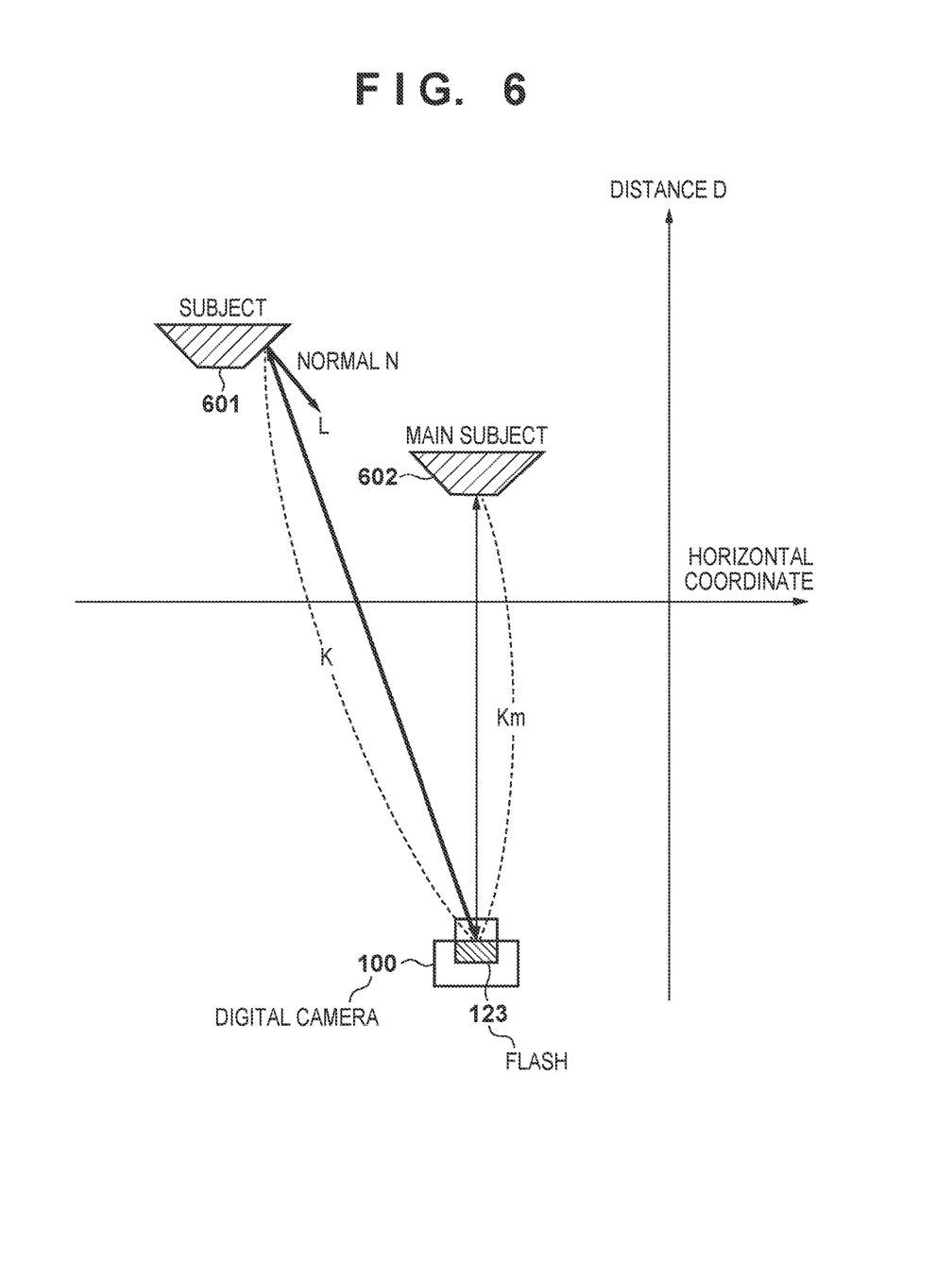
FIG. 6 is a diagram for describing a positional relationship between a subject, a main subject, and a flash according to the embodiment.

In step S408, the virtual light source reflection component calculation unit 304 sets the virtual light source and calculates a reflection component due to the virtual light source in a subject 601. Specifically, in this step, it sets a virtual light source for compensating for a difference of the shading state with the subject that arises due to the flash light emission. In other words, the set virtual light source reduces the difference between an influence (for example, a change in the shading state of a main subject 602) on the main subject 602 due to the flash emission and an influence (for example, a change in the shading state of the subject 601) on the subject 601 due to the light of the flash. Then, the reflection component of the virtual light source that is calculated represents the change in the shading state in the subject that arose due to the set virtual light source, and reduces the difference in the shading state with the subject that arose due to the flash light emission.

Regarding the reflection component due to the virtual light source, the flash intensity in each subject is inversely proportional to the square of the distance K between the flash and the subject, and the reflection component due to the virtual light source is calculated using a difference between the flash intensity at which the light of the flash is irradiated on the subject and the flash intensity at which the light of the flash is irradiated on the main subject, and a characteristic proportional to a dot product of the normal vector N on a surface of the subject and a light source direction vector L of the light of the flash.

A specific method of calculating a reflection component due to the virtual light source is described with reference to FIG. 6. In FIG. 6, a relationship between the subject 601 which is not the main subject, the main subject 602, and the positions of the digital camera 100 and the flash 123 at a time of capturing are illustrated.

The virtual light source reflection component calculation unit 304 can obtain a flash intensity Sk at which the flash 123 irradiates on the subject 601 in accordance with Equation 1 using the distance K between the flash 123 and the subject 601 and an amount of light α of the virtual light source which is based on the amount of light of the flash.

$$Sk = \alpha/K^2 \qquad \text{(Equation 1)}$$

Note that the amount of light α is set to be is equivalent to the actual amount of light of the flash, for example.

Also, a flash intensity Sm at which the flash 123 irradiates the main subject 602 can be obtained in accordance with Equation 2 using the distance Km between the flash 123 and the main subject 602 and the amount of light α of the virtual light source which is based on the amount of light of the flash.

$$Sm = \alpha/Km^2 \qquad \text{(Equation 2)}$$

Note that the amount of light α is the same as the amount of light of the flash indicated in Equation 1, for example.

Furthermore, it is possible to obtain the reflection components (Ra, Ga, Ba) due to the virtual light source in the surface of the subject 601 in accordance with Equation 3 using a flash intensity Sk at which the flash 123 irradiates the subject 601 and a flash intensity Sm at which the flash 123 irradiates the main subject 602.

$$Ra = \beta \times (Sm - Sk) \times (-L \cdot N) \times Rw \times Rt$$

$$Ga = \beta \times (Sm - Sk) \times (-L \cdot N) \times Gt$$

$$Ba = \beta \times (Sm - Sk) \times (-L \cdot N) \times Bw \times Bt \qquad \text{(Equations 3)}$$

Here, L is a three-dimensional vector of the flash 123, and the normal N is a three-dimensional normal vector of the subject, and (Rt, Gt, Bt) is an RGB signal outputted from the de-gamma processing unit 302. The virtual light source reflection component calculation unit 304 obtains the distances (K and Km) and L based on the subject distance information from the distance measurement sensor 124, and obtains the normal N based on the normal map from the normal calculation unit 303. Also, Rw and Bw are color parameters for controlling the color of the light source, and are set to predetermined values to align with the characteristics of the flash 123. By using color parameters in this way, it is possible to reflect the characteristics of the light source in the reflection components of the virtual light source.

Note that β is the gain for adjusting the reflection components (Ra, Ga, Ba) due to the virtual light source, and is set to adjust the effect of the re-lighting processing. Specifically, the gain β is calculated based on an absolute value of the difference between a distance K (a distance between the flash 123 and the subject 601) and a distance Ks (the distance between the flash 123 and the main subject 602).

Figure 7:
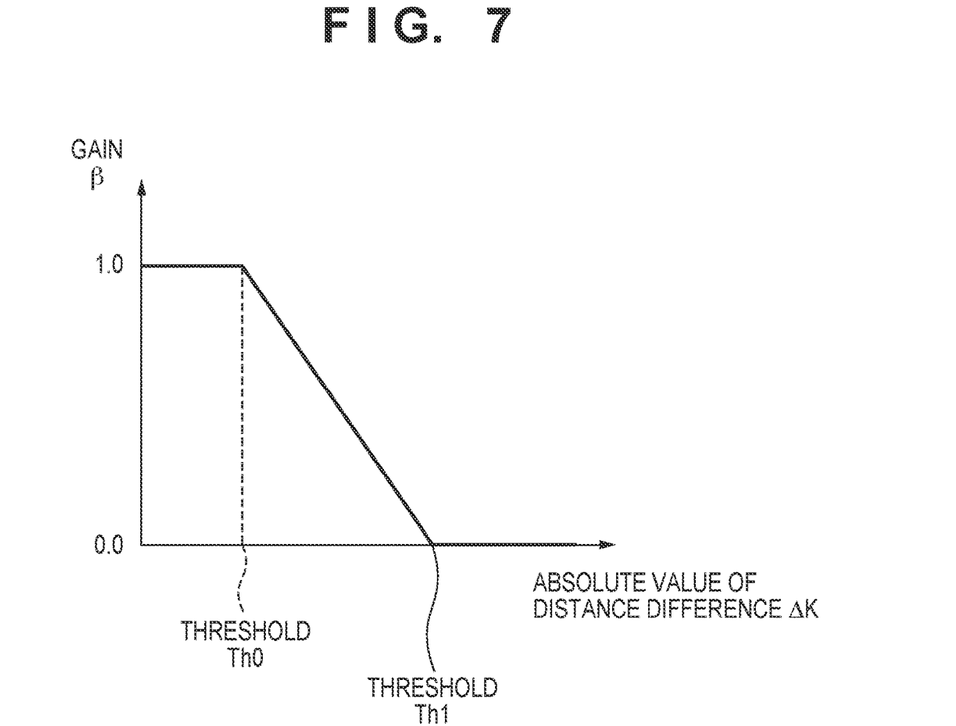
FIG. 7 is a diagram illustrating an example of a characteristic of an absolute value ΔK of the distance difference and a gain β according to the embodiment.

With reference to FIG. 7, an example of calculating the gain β will be described. FIG. 7 illustrates an example of a conversion table for calculating the gain β from ΔK (an absolute value of a difference in distances) which is an absolute value in a difference between the distance K and the distance Ks. The abscissa illustrated in FIG. 7 is the absolute value ΔK of the difference in distances, and the ordinate is the gain β. The gain β is set to 1.0 and output if the absolute value ΔK of the difference in distances is smaller than a predetermined threshold Th0. The gain β is set to 0.0 and output if the absolute value ΔK of the difference in distances is larger than a predetermined threshold Th1. If the absolute value ΔK of the difference of the distances is between a threshold Th0 and a threshold Th1, the gain β is set to a value between 1.0 and 0.0 and output.

By using the gain β, which is set in this way, it is possible to suppress a subject, such as a background subject, for example, that is far from the flash 123 compared to the main subject 602 from becoming as bright as the main subject by the re-lighting processing. Specifically, it is possible to correct to a natural brightness when using a flash.

Accordingly, in Equation 3, the flash intensity Sm becomes larger than the flash intensity Sk, and the reflection components due to the virtual light source become positive values if the subject 601 is further than the main subject 602 (the amount of light on the subject 601 is insufficient in relation to the amount of light on the main subject 602). That is, it is possible to compensate the brightness of the subject 601 by a reflection component according to the virtual light source.

Meanwhile, the flash intensity Sm becomes smaller than the flash intensity Sk, and the reflection components due to the virtual light source become negative values if the subject 601 is closer than the main subject 602 (the amount of light on the subject 601 is excessive in relation to the amount of light on the main subject 602). That is, it is possible to suppress the brightness of the subject 601 by a reflection component according to the virtual light source.

The virtual light source reflection component calculation unit 304 outputs the reflection components (Ra, Ga, Ba) due to the virtual light source which are calculated in accordance with Equations 3 to the virtual light source addition processing unit 305.

In step S409, the virtual light source addition processing unit 305 adds the components (Ra, Ga, Ba) of the virtual light source described above to the captured image. Specifically, the virtual light source addition processing unit 305 adds the virtual light source components (Ra, Ga, Ba) to the linear-converted RGB signal (Rt, Gt, Bt) outputted from the de-gamma processing unit 302 in accordance with the following equations.

$$Rout = Rt + Ra$$

$$Gout = Gt + Ga$$

$$Bout = Bt + Ra$$

In this way, it is possible to adjust shading to reflect a characteristic of a light source that emits light by adding the reflection components due to a virtual light source that reflect a characteristic of the flash to the signal of the captured image. Also, the RGB signal (Rout, Gout, Bout) which is outputted from the virtual light source addition processing unit 305 is inputted into the gamma processing unit 306.

In step S410, the gamma processing unit 306 performs gamma correction on the RGB signal (Rout, Gout, Bout) which is outputted from the virtual light source addition processing unit 305. The RGB signal (R'out, G'out, B'out) after the gamma correction is outputted to the luminance color-difference signal conversion unit 307.

In step S411, the luminance color-difference signal conversion unit 307 generates a luminance Y, and R-Y and B-Y signals which are color difference signals from the RGB signal (R'out, G'out, B'out) after the gamma correction, outputs them to the image memory 106, and terminates the series of operations according to this processing.

Note that in the present embodiment an example of a case in which the flash 123 and the digital camera 100 are a single body is described. However, configuration may be taken such that the flash 123 is installed at a location separated from the digital camera 100 and connected to the digital camera 100 by communication (wired or wireless). In such a case, the virtual light source reflection component calculation unit 304 can calculate the components of the reflection due to the virtual light source similarly to in the present embodiment by obtaining information of the position of the flash 123 in advance.

Also, the virtual light source reflection component calculation unit 304 may further obtain information of an aperture value from the shutter 102 which is equipped with an aperture, and adjust the amount of light α of the virtual light source using the obtained information of the aperture value. By further referencing the information of the aperture value, it is possible to increase the precision of the re-lighting processing by considering the influence of the aperture on the light irradiated from the flash 123. The virtual light source reflection component calculation unit 304 may adjust the amount of light α of the virtual light source depending on the angle from the optical axis of the flash 123 based on an irradiation angle of the flash 123.

Also, if the subject 601 is present at a position closer to the flash 123 than the main subject 602, the flash intensity Sm becomes a value that is smaller than the flash intensity Sk, and the components of the reflection (Ra, Ga, Ba) due to the virtual light source becomes negative values in Equations 3. Also, there are cases in which a portion of the subject 601 is saturated because exposure is adjusted based on the main subject 602. Accordingly, if there is a region that is saturated in the subject 601, it becomes impossible for the shading state of the subject 601 to be corrected appropriately by the reflection components due to the virtual light source. Accordingly, if the subject 601 is present at a position that is closer to the flash 123 than the main subject 602, a saturated region may be interpolated using the RGB signals (Rout, Gout, Bout) of peripheral non-saturated regions.

As described above, in the present embodiment, if a plurality of subjects are present at different distances from the flash 123, a virtual light source which reduces the difference between a change of the shading state in the subject 601 due to the flash 123 and a change in the shading state in the main subject due to the flash 123 is set. Also, the characteristics of this virtual light source are decided based on the characteristics of the flash 123. By this, even if an illumination apparatus such as a flash is used, it is possible to adjust the brightness (in other words, perform re-lighting) of a subject region to reflect the characteristics of the illumination apparatus. In other words, it becomes possible to perform an adjustment of shading that reflects a characteristic of a light source which emits light in an image in which a plurality of subjects whose distances from the light source are different are captured.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-036313, filed Feb. 26, 2016, which is hereby incorporated by reference herein in its entirety.

What is claimed is:

1. An image processing apparatus comprising:
    an obtainment unit configured to obtain an image captured in accompaniment of an emission of a predetermined light source;
    a setting unit configured to set a virtual light source to be applied to the image based on a characteristic of the predetermined light source; and
    a generation unit configured to generate an image for which a shading state of at least one of a plurality of subjects included in the image is changed due to the virtual light source,
    wherein the setting unit is configured to, in a case where a first subject and a second subject, which are included in the image, are present at different distances from the predetermined light source, set the virtual light source so that a difference between a change of a shading state in the first subject due to the predetermined light source and a change in the shading state in the second subject due to the predetermined light source is reduced.

2. The image processing apparatus according to claim 1, wherein the setting unit is configured to set the virtual light source so that the change of the shading state due to the virtual light source in the first subject reduces the difference, and
    wherein the generation unit is configured to generate an image for which the shading state of the first subject is changed.

3. The image processing apparatus according to claim 2, wherein the setting unit is configured to set the virtual light source so that the change of the shading state due to the virtual light source in the first subject changes in accordance with a difference between a distance from the predetermined light source to the first subject and a distance from the predetermined light source to the second subject.

4. The image processing apparatus according to claim 2, wherein the setting unit is configured to set the virtual light source so that the change of the shading state due to the virtual light source in the first subject changes in accordance with a difference between an intensity of a light due to the predetermined light source in the first subject and an intensity of a light due to the predetermined light source in the second subject.

5. The image processing apparatus according to claim 2, wherein the setting unit is configured to set the virtual light source so that the change of the shading state due to the virtual light source in the first subject changes in accordance with a state of an aperture when the image is captured.

6. The image processing apparatus according to claim 2, wherein the change of the shading state due to the virtual light source in the first subject is a reflection component of the virtual light source in the first subject.

7. The image processing apparatus according to claim 1, wherein the image is an image that is captured after adjusting a brightness based on the second subject, and
    wherein the generation unit, in a case when the distance from the predetermined light source to the first subject is shorter than the distance from the predetermined light source to the second subject, generates, based on a signal in which the first subject is not saturated, an image for which a shading state is changed.

8. The image processing apparatus according to claim 1, wherein the second subject is a main subject, and the first subject is a subject that is different to the main subject.

9. The image processing apparatus according to claim 1, wherein the predetermined light source is a flash, and the characteristic of the predetermined light source includes a characteristic related to a light source color.

10. An image capturing apparatus comprising:
    an image sensor configured to output a captured image;
    an obtainment unit configured to obtain an image captured in accompaniment of an emission of a predetermined light source;
    a setting unit configured to set a virtual light source to be applied to the image based on a characteristic of the predetermined light source; and
    a generation unit configured to generate an image for which a shading state of at least one of a plurality of subjects included in the image is changed due to the virtual light source,
    wherein the setting unit is configured to, in a case where a first subject and a second subject, which are included in the image, are present at different distances from the predetermined light source, set the virtual light source so that a difference between a change of a shading state in the first subject due to the predetermined light source and a change in a shading state in the second subject due to the predetermined light source is reduced.

11. The image capturing apparatus according to claim 10, further comprising a flash apparatus which is the predetermined light source and which emits light upon capturing.

12. A control method of an image processing apparatus comprising:
    obtaining an image captured in accompaniment of an emission of a predetermined light source;
    setting a virtual light source to be applied to the image based on a characteristic of the predetermined light source; and
    generating an image for which a shading state of at least one of a plurality of subjects included in the image is changed due to the virtual light source,
    wherein, in a case where a first subject and a second subject, which are included in the image, are present at different distances from the predetermined light source, the virtual light source is set so that a difference between a change of a shading state in the first subject due to the predetermined light source and a change in the shading state in the second subject due to the predetermined light source is reduced.

13. A non-transitory computer-readable storage medium storing a program for causing a computer to execute a control method of an image processing apparatus comprising:

obtaining an image captured in accompaniment of an emission of a predetermined light source;

setting a virtual light source to be applied to the image based on a characteristic of the predetermined light source; and generating an image for which a shading state of at least one of a plurality of subjects included in the image is changed due to the virtual light source, wherein, in a case where a first subject and a second subject, which are included in the image, are present at different distances from the predetermined light source, the virtual light source is set so that a difference between a change of a shading state in the first subject due to the predetermined light source and a change in the shading state in the second subject due to the predetermined light source is reduced.

14. A control method of an image capturing apparatus comprising an image sensor and a flash apparatus, the control method comprising:

capturing an image in accompaniment of an emission of the flash apparatus;

setting a virtual light source to be applied to the image based on a characteristic of the flash apparatus; and generating an image for which a shading state of at least one of a plurality of subjects included in the image is changed due to the virtual light source, wherein, in a case where a first subject and a second subject, which are included in the image, are present at different distances from the flash apparatus, the virtual light source is set so that a difference between a change of a shading state in the first subject due to the flash apparatus and a change in the shading state in the second subject due to the flash apparatus is reduced.

15. A non-transitory computer-readable storage medium storing a program for causing a computer to execute a control method of an image capturing apparatus comprising an image sensor and a flash apparatus, the control method comprising:

capturing an image in accompaniment of an emission of the flash apparatus;

setting a virtual light source to be applied to the image based on a characteristic of the flash apparatus; and generating an image for which a shading state of at least one of a plurality of subjects included in the image is changed due to the virtual light source, wherein, in a case where a first subject and a second subject, which are included in the image, are present at different distances from the flash apparatus, the virtual light source is set so that a difference between a change of a shading state in the first subject due to the flash apparatus and a change in the shading state in the second subject due to the flash apparatus is reduced.

* * * * *